(12) United States Patent
Jensen

(10) Patent No.: US 9,238,707 B2
(45) Date of Patent: Jan. 19, 2016

(54) METHOD OF MODIFYING THE RATE OF TEMPERATURE CHANGE OF AN EPOXY RESIN COMPOSITION IN A RESIN CONTAINER DURING A CASTING PROCESS

(71) Applicant: Martin Jensen, Aalborg (DK)

(72) Inventor: Martin Jensen, Aalborg (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 103 days.

(21) Appl. No.: 13/951,503

(22) Filed: Jul. 26, 2013

(65) Prior Publication Data

US 2014/0046007 A1 Feb. 13, 2014

(30) Foreign Application Priority Data

Aug. 8, 2012 (EP) ..................... 12179634

(51) Int. Cl.

| | |
|---|---|
| *C08K 5/092* | (2006.01) |
| *C08K 5/20* | (2006.01) |
| *C08L 63/00* | (2006.01) |
| *C08L 63/02* | (2006.01) |
| *B29C 39/44* | (2006.01) |
| *C08G 59/50* | (2006.01) |
| *B29C 70/44* | (2006.01) |
| *C08G 59/18* | (2006.01) |
| *C08G 59/40* | (2006.01) |
| *B29C 39/00* | (2006.01) |

(52) U.S. Cl.
CPC ............ *C08G 59/504* (2013.01); *B29C 39/006* (2013.01); *B29C 39/44* (2013.01); *B29C 70/44* (2013.01); *C08G 59/18* (2013.01); *C08G 59/40* (2013.01); *C08K 5/092* (2013.01); *C08K 5/20* (2013.01); *C08L 63/00* (2013.01)

(58) Field of Classification Search
None
See application file for complete search history.

(56) References Cited

U.S. PATENT DOCUMENTS

| | | | |
|---|---|---|---|
| 3,753,766 A * | 8/1973 | Brown et al. | 138/97 |
| 5,508,328 A | 4/1996 | Olson | |
| 5,721,323 A | 2/1998 | Bertram | |
| 6,613,839 B1 | 9/2003 | Everett | |
| 2006/0189721 A1 * | 8/2006 | Akiyama et al. | 523/400 |
| 2009/0130379 A1 * | 5/2009 | Kousaka et al. | 428/116 |

FOREIGN PATENT DOCUMENTS

| | | |
|---|---|---|
| DE | 3223635 A1 | 12/1983 |
| EP | 0458502 A2 | 11/1991 |
| EP | 1325937 A1 | 7/2003 |
| RU | 2149169 C1 * | 5/2000 |
| WO | WO 9512627 A1 | 5/1995 |
| WO | WO 9831750 A1 | 7/1998 |
| WO | WO 2007075769 A1 | 7/2007 |
| WO | WO 2009103736 A2 | 8/2009 |

\* cited by examiner

*Primary Examiner* — Robert Sellers

(57) ABSTRACT

A method for modifying a rate of temperature change of an epoxy resin composition in a resin container during a resin casting process is proposed. The resin composition has at least one epoxy monomer component and a curing agent. A passivation agent for the curing agent is added to the epoxy resin composition. A resin container arrangement for use in such a resin transfer moulding process, a composite product having an epoxy resin composition, and a use of an organic acid in an epoxy resin casting process as a passivation agent for modifying the rate of temperature change in a resin container containing an epoxy resin composition are proposed.

7 Claims, 2 Drawing Sheets

METHOD OF MODIFYING THE RATE OF TEMPERATURE CHANGE OF AN EPOXY RESIN COMPOSITION IN A RESIN CONTAINER DURING A CASTING PROCESS

CROSS REFERENCE TO RELATED APPLICATIONS

The present application claims priority to European Patent Office application No. 12179634.6 EP filed Aug. 8, 2012, the entire content of which is hereby incorporated herein by reference.

FIELD OF INVENTION

The invention relates to a method of modifying the rate of temperature change and preferably of lowering the temperature of an epoxy resin composition in a resin container during a resin casting process, especially a resin infusion or a resin transfer moulding (RTM) process, a resin container arrangement for the use in such a resin transfer moulding process, a composite product comprising an epoxy resin composition, and a passivation agent in an epoxy resin casting process.

BACKGROUND OF INVENTION

WO 2009103736 describes a vacuum infusion or vacuum assisted resin transfer moulding process (VARTM) process used for moulding fibre composite mouldings. In such a process uniformly distributed fibres are layered in a first mould part, the fibres being rovings, i.e. bundles of fibre bands, bands of rovings or mats, which are either felt mats made of individual fibres or woven mats made of fibre rovings. A second mould part, which is often made of a resilient vacuum bag, is subsequently placed on top of the fibre material. By generating a vacuum in the mould cavity between the inner side of the first mould part and the vacuum bag, the liquid resin can is drawn in and fill the mould cavity with the fibre material contained in the mould. So-called distribution layers or distribution tubes are used between the vacuum bag and the fibre material in order to obtain as sound and efficient distribution of resin as possible. In most cases the resin applied is polyester, vinyl ester or epoxy, and the fibre reinforcement is most often based on glass fibres or carbon fibres, but may also be plastic fibres, plant fibres or metal fibres.

The liquid resin is provided in a resin container, also called mixing bucket, filled with a resin/curing agent composition prepared in a mixing unit, adapted for mixing the resin monomer components and the curing agent in the respective amounts. As the curing reaction has already been started in the mixing unit, the exothermic polymerisation continuously raises the temperature in the resin container.

During the process of filling the mould, a vacuum, i.e. an under-pressure or negative pressure, is generated in the mould cavity, whereby liquid resin is drawn from the resin container or mixing bucket into the mould cavity via the inlet channels in order to fill said mould cavity. From the inlet channels the resin disperses in all directions in the mould cavity due to the negative pressure as a flow front moves towards the vacuum openings for generating vacuum inside the mould.

In the resin container such as the mixing buckets or the overflow container in such casting processes, e.g. blade casting methods for wind rotor blades, no solution exists for preventing the ignition of fire during the curing process which is caused by the exothermic reaction between the epoxy resin monomers and the curing agent. Conventionally, the mixing bucket is moved outdoors if signs of fire ignition or smoke development are observed in the mixing bucket to avoid any damages of the casting apparatus or the casting facilities and to protect the working environment of the staff around the blade mould.

U.S. Pat. No. 5,721,323 describes a prepreg containing a resin composition consisting of a polyepoxide, a curing agent, a catalyst for the reaction of the polyepoxide with the curing agent and a Lewis acid cure inhibitor for inhibiting the catalyst by means of forming a catalyst Lewis acid inhibitor complex. Cured and partially cured epoxy resins are used in coatings or laminates, wherein the inhibitor is used for inhibiting the curing reaction of polyepoxide by forming a stable complex between the curing agent and the Lewis acid in the prepreg and releasing the catalyst if a predetermined temperature level has been reached during the curing process. This inhibiting method is used for storing the polyepoxide resin composition in prepregs which are then used in moulding processes of composite parts. However, these prepregs are not used in casting process such as rein transfer moulding processes.

SUMMARY OF INVENTION

It is an object of the present invention to improve the safety of casting processes, in particular to prevent the ignition of fire in a mixing bucket during a casting process like a resin infusion or resin transfer moulding process, and to provide composite products in a safe and economic manner.

The object of the invention is achieved by a method of modifying the rate of temperature change of an epoxy resin composition in a resin container during a resin casting process, a resin container arrangement for the use in such a resin transfer moulding process, a composite product comprising an epoxy resin composition, and the use of an organic acid in an epoxy resin casting process according to the claims.

The method of modifying or changing the rate of temperature change of an epoxy resin composition in a resin container, that means in the resin filled system, during a resin casting process according to a first aspect of the invention comprises the step of adding a passivation agent for the curing agent to the epoxy resin composition. The resin composition comprises at least one epoxy monomer component and a curing agent. A passivation agent as understood in the following description of the invention inhibits the polymerization reaction and is advantageously a curing agent reactive component, which causes a modification of the rate of temperature change and especially a lowering of the reaction temperature during the reaction with the curing agent. Especially, the passivation agent, as used according to the invention, does not cause a passivation of the surface of any reaction component, but changes the total reaction temperature or enthalpy of all reactions taking place in the resin mixture. More particularly, the passivation reaction is not an inhibition of the polymerization reaction by means of lowering the reaction rate, but reduces the amount of free curing agent by the passivation agent, while generating less heat in this reaction as will be generated by the polymerisation reaction. Hence, the reaction enthalpy can be reduced by adding a passivation agent into the curing reaction. In addition or alternatively, the time of generating reaction heat can be prolonged by the addition of the passivation agent.

The ignition of a fire in a mixing bucket in which the polymerisation reaction takes place can advantageously prevented by modifying the rate of temperature change or inhibiting the increase of the temperature of the reactions between the catalyst and the epoxy monomers and the catalyst and the passivation agent which are generally exothermic reactions.

Thus, the modification of the rate of temperature change of the exothermic polymerisation reaction by means of the addition of a passivation agent into the resin composition usually allows a safer processing. In particular, the step of potentially moving the mixing buckets out of the factory site in case first signs of fire ignition or smoke are observed in the mixing bucket can be omitted. Hence, a safer and more reliable casting process has been developed.

A resin container arrangement according to a second aspect of the invention is adapted for the use in a resin transfer moulding process. The arrangement can be an integrally provided system or a system with separated means which can be combined to the total arrangement or can be a part of a casting apparatus. The arrangement comprises at least a mixing bucket and a passivation agent container, which are preferably fluently connected with each other in order to can add the passivation agent into the mixing bucket. The resin container arrangement is used for mixing an epoxy resin composition comprising at least one epoxy resin monomer component and a curing agent with a passivation agent in the mixing bucket in order to achieve the effects described in the first aspect of the invention.

According to a third aspect of the invention, a composite product, preferably being prepared according to the method of the first aspect, comprises an epoxy resin composition or is based on an epoxy resin composition, generally containing 50 wt-% of epoxy resin or even more. The composite product comprises a passivation agent or a reaction product of a passivation agent and a curing agent. The product differs from conventional products in an amount of passivation agent or its reaction product obtained by the passivation reaction. The amounts can be 1 to 20 wt-%, preferably 1 to 10 wt-%, more preferably lower than 5 wt-%. Depending on the curing rate and the temperature within the mixing container, the free organic acid or any reaction product with the curing agent may be present in the finished product. Thus, it is easy to determine whether or not the product has been obtained by using an organic acid during the manufacturing method of the composite products. The products may have fewer defects due to high temperatures inside the mould during the casting process and, thus, are advantageous over the conventional products, especially are more reliable.

The epoxy resin composition used in such a method, resin container arrangement, or product comprises, according to another aspect of the invention, at least one epoxy resin monomer component, a curing agent and a passivation agent. This epoxy resin composition can advantageously used in a resin infusion or RTM process, for example for manufacturing blades for wind rotors. The epoxy resin composition preferably modifies the rate of temperature change or even lowers the temperature in a resin container used for mixing a resin monomer component with a curing agent. The passivation agent inhibits the increase of the temperature or reduces the total reaction temperature and, thus, prevents the resin mixture from ignition of a fire.

According to a further aspect of the invention, the application refers to the use of an organic acid in an epoxy resin casting process, preferably a resin infusion or resin transfer moulding process (RTM). The organic acid is added to a resin container, e.g. a resin filled system part such as the mixing bucket or resin overflow container, in order to keep the temperature level at a predefined maximum temperature by means of lowering the rate of the temperature increase by means of passivation an amount of the curing agent with the passivation agent. Thereby, the passivation reaction preferably elongates the time for raising the temperature in the resin container. Alternatively, the passivation reaction substantially keeps constant or lowers the temperature of the resin mixture contained therein. This can advantageously initiated by means of a reaction between the curing agent and the passivation agent as defined with regard to the first aspect of the invention. Keeping the temperature "substantially constant" means the temperature rising rate is very small or preferably nearly zero.

Particularly advantageous embodiments and features of the invention for improving, for example, the safety of such casting processes or making the processes more cost effective, are given by the dependent claims, as revealed in the following description. Further embodiments may be derived by combining the features of the various embodiments described in the following, and features of the various aspects and/or claim categories can be combined in any appropriate manner.

In a preferred embodiment of the method according to the invention, the curing agent comprises an amine-based curing agent because those curing agents are stable and cheap. Preferred examples are primary ($R-NH_2$) or secondary ($R-NH-R'$) amines. Amines generally have reactive sites for reacting with the epoxy groups of the epoxy resin monomers in a step (growth) polymerization reaction by generating epoxy-amine reaction products which can be combined to each other forming oligomers or polymers. Additionally, chain reactions or side reactions like forming side chains can take place. Exemplified amine-based curing agents can be aliphatic, cycloaliphatic or aromatic amines.

The passivation agent used in a preferred embodiment according to the invention may comprise an organic acid which can more preferably form a salt with the curing agent. More preferably, the organic acid is a hydrophilic organic acid comprising more than one hydrophilic group. Advantageously, divalent or trivalent organic acids, that means organic acids with at least two carboxyl groups such as citric acid or malic acid (e.g. two, three, or more carboxyl groups) can be used. The divalent or trivalent organic acids are preferred because breaking the hydrogen bonds or interactions between two carboxyl groups is an endothermic process which reduces the total reaction temperature (the free enthalpy) of the passivation agent modified curing process. After dissolution of the organic acid in resin mixture, the acid undergoes an exothermic reaction with the amine groups in the curing agent. The organic acid is chosen in such a manner that the enthalpy of the dissolution and the enthalpy of the amine reaction are of similar size. More preferably, the enthalpy of the dissolution exceeds that of the reaction between the amine and the organic acid. By reacting with the organic acid, the amine groups become unavailable for the exothermic reaction with the epoxy groups. Owing to the lower availability of amine groups, the temperature increase during the curing process of the epoxy is suppressed. Thereby, the rate of the rise of the temperature in the resin container can be slowed down. That means the rate of the temperature change, or the temperature generated in the resin container over the curing time can be lowered in the mixing container by passivation of a part of the curing agent.

The curing reaction, i.e. the polymerization reaction and especially the rate of the polymerization reaction, is not significantly affected. The amount of the curing agent is reduced and, thus, the addition of the passivation agent mainly reduces the curing extent which can for example be measured by determining the glass transition temperature of the cured resin mixture.

Alternatively, the passivation of the curing agent by the passivation agent may also be reversible. Then, the curing reaction is temporarily inhibited and the resin can be cured in its full extent after the temporary passivation has been removed This can for example be done if the formed salt is unstable at larger temperatures, i.e., the salt dissolves after the reaction heat of the polymerization reaction generated sufficient heat to liberate the amine groups. Furthermore, it is preferred that the acid evaporates after liberation from the salt during the curing reaction or is embedded in the cured epoxy. An incorporation or the acid into the cured epoxy can lower the strength of the cured epoxy resin.

A further preferred embodiment of the method according to the invention uses an organic acid comprising one or more hydrophilic substituents at its backbone. Preferred hydrophilic groups are additional carboxylic groups or hydroxyl groups. If more hydrophilic groups are present the enthalpy of dissolution of the passivation agent in the resin mixture is more positive and, thus, the increase in temperature of the total reaction is smaller or the temperature is even lowered to some extent in the resin container during the curing reaction.

The epoxy resin composition used in a further embodiment of the method according to the invention comprises the epoxy resin monomer component in an amount of 100 parts per weight and a curing agent in an amount of about 10 to 40 parts per weight, preferably more than 20 and less than 30 parts per weight, more preferably between 25 and 28 parts per weight. Advantageously, the passivation agent is contained in this composition in an amount sufficient for at least partly reacting with the curing agent and sufficient to lower the temperature of the resin composition, more preferably in a molar amount of about 2 to 30 parts per mole, more preferably about 5 to 20 parts per mole and in particular about 10 parts per mole of curing agent, for example of the molar amount of reactive amine groups.

According to a preferred embodiment of the method according to the invention, the passivation agent is added to the resin container in a step of curing a resin composition of a resin infusion or resin transfer moulding (RTM) process. Preferably the resin composition comprises excess resin not used for casting a product which is for example kept in the resin system such as the resin mixing bucket or the resin overflow container but also in the respective connections between the respective system parts such as lines. Preferred resin containers into which the passivation agent can be added, are the mixing bucket or overflow container in an RTM process, especially in a VARTM process.

It is preferred that the method according to a preferred embodiment comprises the step of adding the passivation agent in the form of a solution into the resin container. The solution can be prepared directly before the addition. Alternatively, the passivation agent can be stored in the form of a solution. Especially if the passivation agent is solid at room temperature, it is preferred to dissolve it into a suitable solvent, preferably a solvent which is already used in the resin composition or the reaction mixture. Of course, if the passivation agent is in solid or liquid (pure or dissolved in a solvent) form at room temperature, the direct addition in the respective form is likewise possible. After the addition of the solid passivation agents or the passivation agents in liquid or dissolved form, the resin mixture preferably is stirred by a stirrer in the resin container to dissolve the passivation agent in the resin mixture.

The method is preferably used for casting processes such as RTM processes in the field of manufacturing blades, for example wind rotor blades. However, it can be used in the field of automobile production or a similar field of engineering, in which high amounts, that means up to several kilograms, for example 1 to 10.000 kg, preferably, 10 to 5.000 kg, of mixed resin compositions are prepared in resin containers such as mixing buckets. Especially in these fields it is demanded to lower the temperature or at least the rate of temperature rise of the resin mixtures to be cured in the resin containers to improve the working environment of the workers in relation to safety and in order to reduce the risk of fire inside the production sites at the factories.

The use of an organic acid in an epoxy resin casting process as a passivation agent for modifying the rate of temperature change in a resin container containing an epoxy resin composition comprising at least one epoxy monomer component and a curing agent is therefore a relative economic solution and can easily be implemented in or added to conventional processes. More particularly, the reaction heat or the energy release during the polymerisation reaction is lowered, at least to some extent, or is generated over a larger reaction time. Therefore, the resin container according to the second aspect or the use of an organic acid according to the third aspect of the invention in a casting process such as a RTM process has the same advantages as described with regard to the method according to the invention. Thereby, the temperature of the resin contained in the resin container arrangement can be manually or automatically controlled to a temperature below the ignition point, preferably below about 250° C., and more preferably below about 190° C. In case of resin amounts below 2 kg, for example in amounts of between 0.2 kg to 1.5 kg, preferred upper temperature limits are about 160° C., more preferably about 150° C., 140° C., 130° C., 120° C., 110° C. or lower.

It is preferred that the resin container is a resin mixing bucket or a resin overflow container. According to a preferred embodiment, the organic acid can, thus, be used for preventing ignition of fire in a mixing bucket or resin overflow container of a resin infusion or a resin transfer moulding process. Such containers can contain about 1 to 50 l of mixed epoxy resin. The larger the epoxy resin amount contained therein the larger is the risk of ignition.

According to a preferred embodiment of the composite product according to the invention, the passivation agent or the reaction product is contained in the form of an organic acid, an ammonium carboxylate salt of an organic acid and an amine-based curing agent, an amide product between an organic acid and an amine-based curing agent or a mixture of them. Depending on the temperature during the casting process, the end product may contain either the free organic acid to some extent or a reaction product of the free acid and the curing agent, especially an amine-based curing agent. In this case, the first step of the passivation reaction can be the formation of an amine salt between the organic acid and the amine-based curing agent. At a temperature of 100° C. or higher, the ammonium carboxylate salt may be transformed into an amide consisting of the residues of the original acid and amine. Thus, depending on the temperature within the resin mixture, the free organic acid, the ammonium carboxylate salt or the amide may be contained alone or in a mixture of two or three of these components.

The composite product prepared by the method of the present invention or prepared by using an organic acid during the casting process can be a wing or blade, in particular for wind rotors, or a car part. As fewer defects are present within the composite product, those products are advantageous over the conventionally prepared products.

BRIEF DESCRIPTION OF THE DRAWINGS

Other objects and features of the present invention will become apparent from the following detailed description considered in conjunction with the accompanying drawing. It is to be understood, however, that the drawing is designed solely for the purpose of illustration and not as a definition of the limits of the invention.

DETAILED DESCRIPTION OF INVENTION

Figure 1:
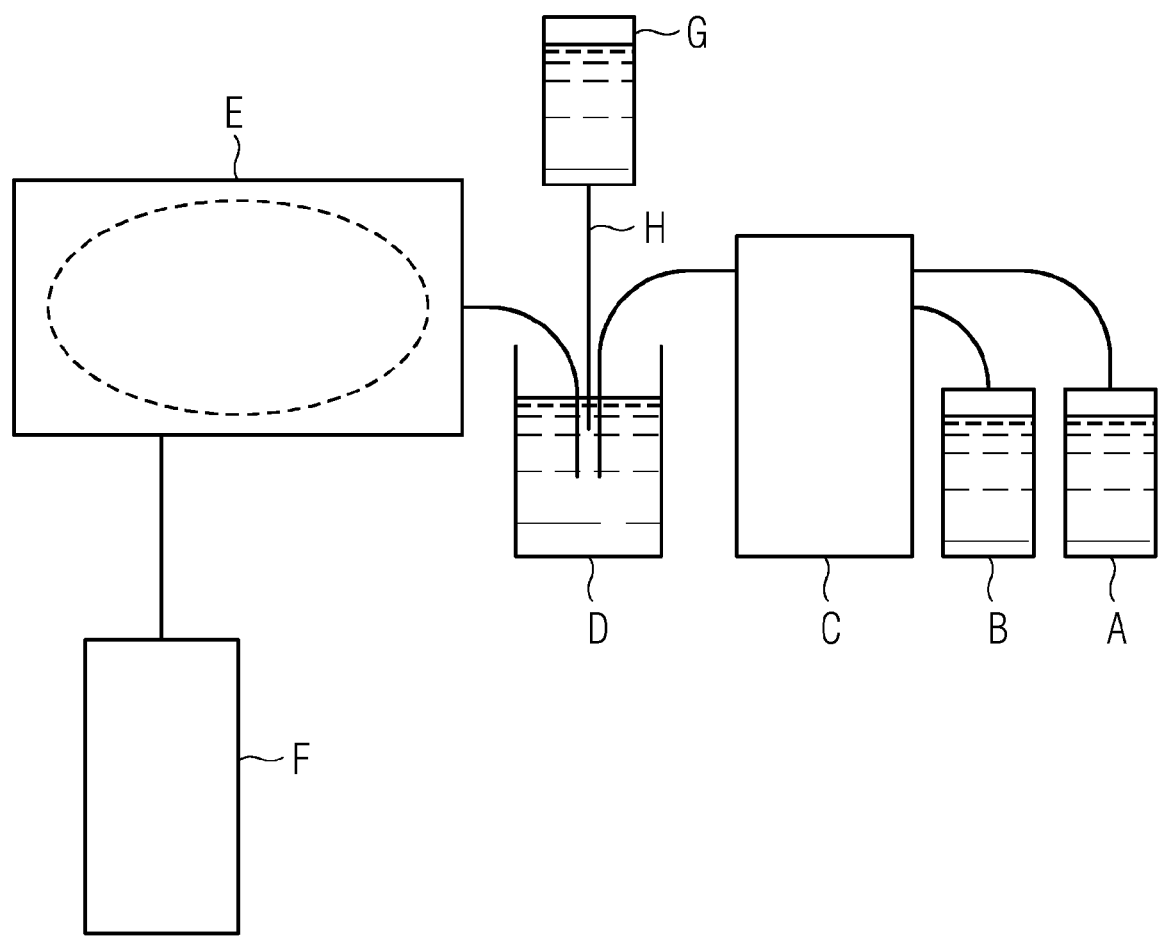
FIG. 1 shows a schematic cross-sectional view of an RTM apparatus comprising a passivation agent container.

The FIG. 1 shows an RTM apparatus with a pure resin container A, a pure hardener or curing agent container B, a mixing unit C, a mixing bucket D, a blade mould E and an overflow container F for excess resin. Moreover, a passivation agent container G and a passivation agent inlet H are provided and connected with the mixing bucket D.

The RTM process is generally done by mixing the pure resin (an epoxy resin) and the pure hardener (an amine) in the mixing unit C and pouring the resin/hardener mixture into the mixing bucket D. The resin/hardener mixture is then used for casting the blade in the blade mould E by means of vacuum assisted resin transfer moulding. After the moulding of the blade in the blade mould, the excess resin is collected in the resin overflow container F and disposed after the resin mixture is hardened. Of course other casting processes can be used as well and also fall within the scope of the present invention.

In the mixing bucket D, the temperature raises because of the exothermic polymerization reaction of the epoxide monomers with the amine curing agent. In order to keep the temperature in the mixing bucket D within a predetermined temperature range, the temperature is controlled and, if necessary, an organic acid is added from the passivation agent container G via the passivation agent inlet H. The addition of the passivation agent can be controlled by means of a manual or automatic control means (not shown) which can receive temperature measuring signals from the temperature sensor inside the mixing bucket D. Thereby, the temperature can be controlled within a level in order to prevent fire ignition inside the mixing bucket D during or after the casting process, preferably to keep the temperature below 250° C.

Figure 2:
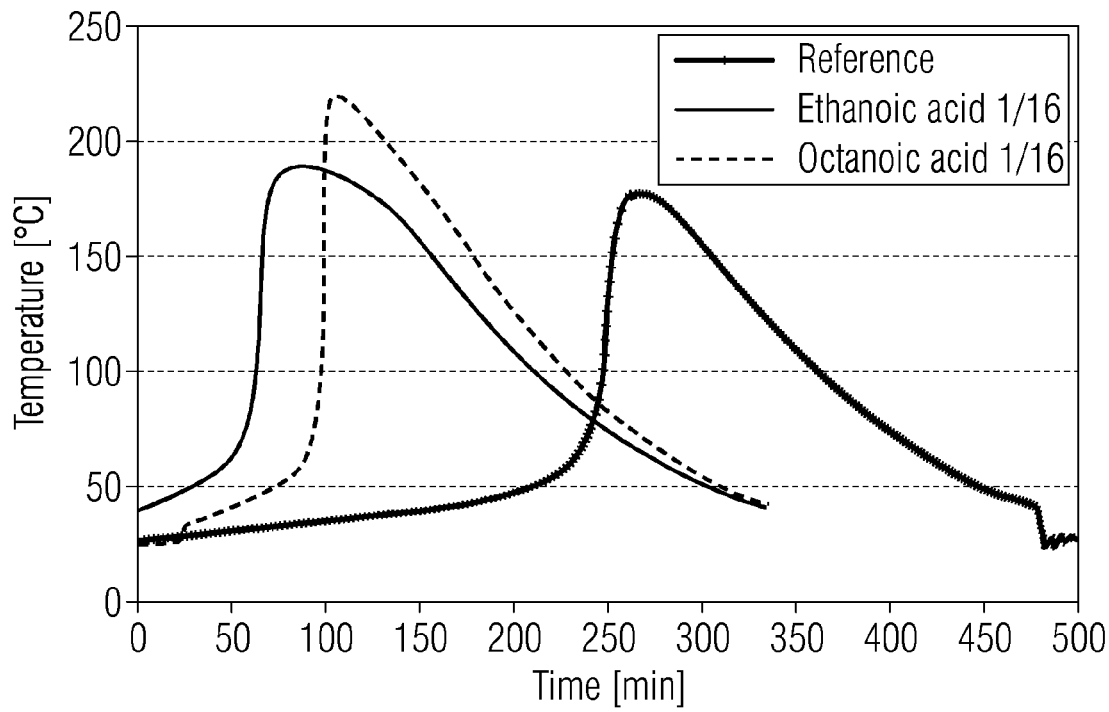
FIG. 2 shows a temperature vs. time plot of the experimental results obtained in Examples 1 and 2.

FIG. 2 shows a temperature vs. time plot of the experimental results obtained with the organic acids ethanoic acid and octanoic acid in examples 1 and 2 compared to a reference sample. The monovalent acids both show a faster increase of the temperature than the reference sample. Moreover, the maximum temperature in the resin container is higher or similar to that of the reference sample.

FIG. 2 shows a temperature vs. time plot of the experimental results obtained with malic acid and citric acid in examples 3 and 4 compared to a reference sample. The samples containing organic acids having more than one carboxylic acid group, such as two in malic acid and three in citric acid, respectively, show a significantly reduced maximum temperature of about 90 to 110° C., and a slow temperature increase than the reference sample. Details will be explained in the following description of the examples.

EXAMPLES 1 to 4

General Experimental Procedure:

The experiments were carried out with the industrially available epoxy system from Momentive, RIM035/RIMH038. The RIM035 resin is based on at least 90 wt-% diglycidylether of bisphenol A (DGEBA) and less than 10 wt-% of C12 and C14 monooxiranes. The RIMH038 curing agent contains 50-70 wt-% polyoxypropylenediamine. The resin and the curing agent were prior to experiments preheated to 25° C. 587.3 g of RIM035 resin was mixed with 162.7 g RIMH038 curing agent (stoichiometric ratio). The curing agent and the resin were manually mixed with a wooden spatula for 4 minutes in a mixing bucket. After mixing the curing agent and the resin, the organic acid was added to the mixture in a molar ratio of 1/16 with respect to the curing agent content. The added organic acids had room temperature. After adding the acid, the mixture was stirred again. A J-type temperature sensor was placed in the centre of the mixing bucket containing the resin, curing agent and organic acid and the mixing bucket was placed in a Friocell heating chamber (MMM Medcenter Einrichtungen, Germany) operating at 25° C. The temperature in the mixture was measured every minute throughout the curing process.

The following organic acids have been used in the Examples 1 to 4 (all acids have been obtained from Sigma-Aldrich):

EXAMPLE 1 acetic acid (purity ≥99% LOT SHBB1567V), also called ethanoic acid

EXAMPLE 2 octanoic acid (purity ≥98% LOT STBC3482V)

EXAMPLE 3

DL-malic acid (purity ≥98% LOT SLBB6897V)

EXAMPLE 4 citric acid (99% purity, LOT 091M0211V)

Figure 3:
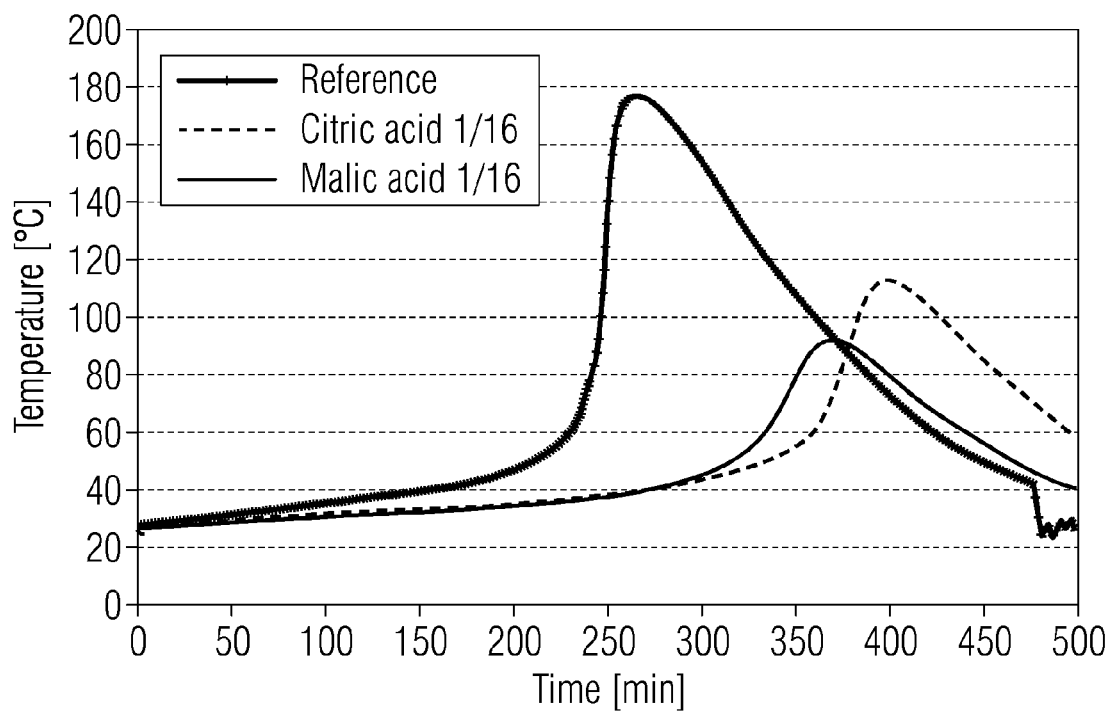
FIG. 3 shows a temperature vs. time plot of the experimental results obtained in Examples 3 and 4.

The reference sample shown in the FIGS. 2 and 3 is the same resin mixture without the use of any passivation agent.

In FIG. 2, the graphs represent the temperature measured in the mixing bucket every minute for the two organic acids ethanoic acid and octanoic acid and the reference sample. As the two organic acids are liquid at room temperature, they were added to the mixing bucket in liquid form. From FIG. 2 it can be gathered that the resin mixture containing ethanoic acid shows a strong increase of the temperature after about 50 minutes while the maximum temperature was about 180° C. (at about 70 to 130 minutes). The corresponding octanoic acid sample shows a significant temperature increase at about 100 minutes after the addition of the organic acid, while the maximum temperature was about 220° C.

FIG. 3 shows the respective graphs for the resin samples containing malic acid and citric acid, respectively, compared to the graph of the reference sample. The two organic acids are solid at room temperature and, thus, were added in the solid form. The resin mixture cured under heat generation by the exothermic polymerisation reaction. The maximum temperature was about 90° C. and about 110° C. for malic acid and citric acid, respectively. The maximum temperature in the mixing bucket was significantly lower in the samples with the organic acids compared to the temperature measured in the reference sample. The maximum temperature peak was measured after about 350 and 400 minutes, respectively. Therefore, the Examples 3 and 4 show that the hydrophilic organic acids having two or three carboxylic groups slow down the increase in temperature of the resin mixture during the polymerization reaction because of passivation of parts of the curing agent by the organic acid.

EXAMPLE 5

Temperature Increase

To clarify the different role of hydrophobic acids (ethanoic and octanoic acid) and hydrophilic acids (citric and malic acid), the temperature immediately after mixing was measured. The experimental setup was similar to the one described in the Examples 1 to 4 and the molar ratio of acid was 1/16 with respect to the curing agent. The temperature increase was determined as the difference between the highest obtained temperature within the first 5 minutes after the addition of the organic acid and the temperature prior to the addition of the organic acid.

These were the results:
Citric acid 0.3° C.
DL-malic acid 0.4° C.
Ethanoic acid 6.2° C.
Octanoic acid 7.6° C.

In the light of the above results, it has been shown that organic acids capable of lowering the peak temperature during curing display a temperature increase below 1° C. in the first 5 minutes after the addition of the organic acid. That means, organic acids capable of limiting the temperature increase in the first minutes to a maximum change of about 1° C., such as the solid and/or hydrophilic organic acids having more than one carboxylic groups are preferred in the use as passivation agent. The reason may be the endothermic breakage of the hydrogen bonds in the hydrophilic organic acid, for example between the two or more carboxylic groups. Otherwise the dissolution enthalpy necessary for dissolving the solid organic acids in the resin mixture may be responsible for the advantageous results of the malic and citric acid.

Although the present invention has been disclosed in the form of preferred embodiments and variations thereon, it will be understood that numerous additional modifications and variations could be made thereto without departing from the scope of the invention. While the invention has been described with reference to RTM processes for manufacturing wind turbine blades, other resin composite materials such as wings or rotors for airplanes, helicopters, coolers, or car parts as well as parts in the automotive industry or similar devices may also be prepared with the method of the invention. An organic acid as passivation agents can generally be used in the field of casting processes or resin transfer moulding processes, e.g. in vacuum assisted resin transfer moulded processes etc. For example, the organic acid can be used for automatically controlling the temperature in resin containers used in casting processes. For the sake of clarity, it is to be understood that the use of "a" or "an" throughout this application does not exclude a plurality, and "comprising" does not exclude other steps or elements. A "container", "unit", "means" or "device" can comprise a number of separate containers, units, means or devices, unless otherwise stated.

The invention claimed is:

1. A method for modifying a rate of temperature change of an epoxy resin composition in a resin container during a resin casting process comprising:
    providing an epoxy resin composition comprising at least one epoxy resin component and a curing agent in the resin container, and
    adding an amount of a passivation agent for the curing agent to the epoxy resin composition in the resin container, wherein the amount of the passivation agent comprises from 2 to about 30 parts by weight per mole of the curing agent.

2. The method according to claim 1, wherein the curing agent comprises a primary or secondary amine.

3. The method according to claim 1, wherein the passivation agent comprises an organic acid.

4. The method according to claim 3, wherein the organic acid comprises one or more hydrophilic substituents.

5. The method according to claim 4, wherein the hydrophilic substituents comprise hydroxyl groups.

6. The method according to claim 1, wherein the epoxy resin component is in an amount of 100 parts per weight and the curing agent is in an amount of about 10 to 40 parts per weight.

7. The method according to claim 1, wherein the passivation agent is added in a form of a solution into the resin container.

* * * * *